Figure 1:
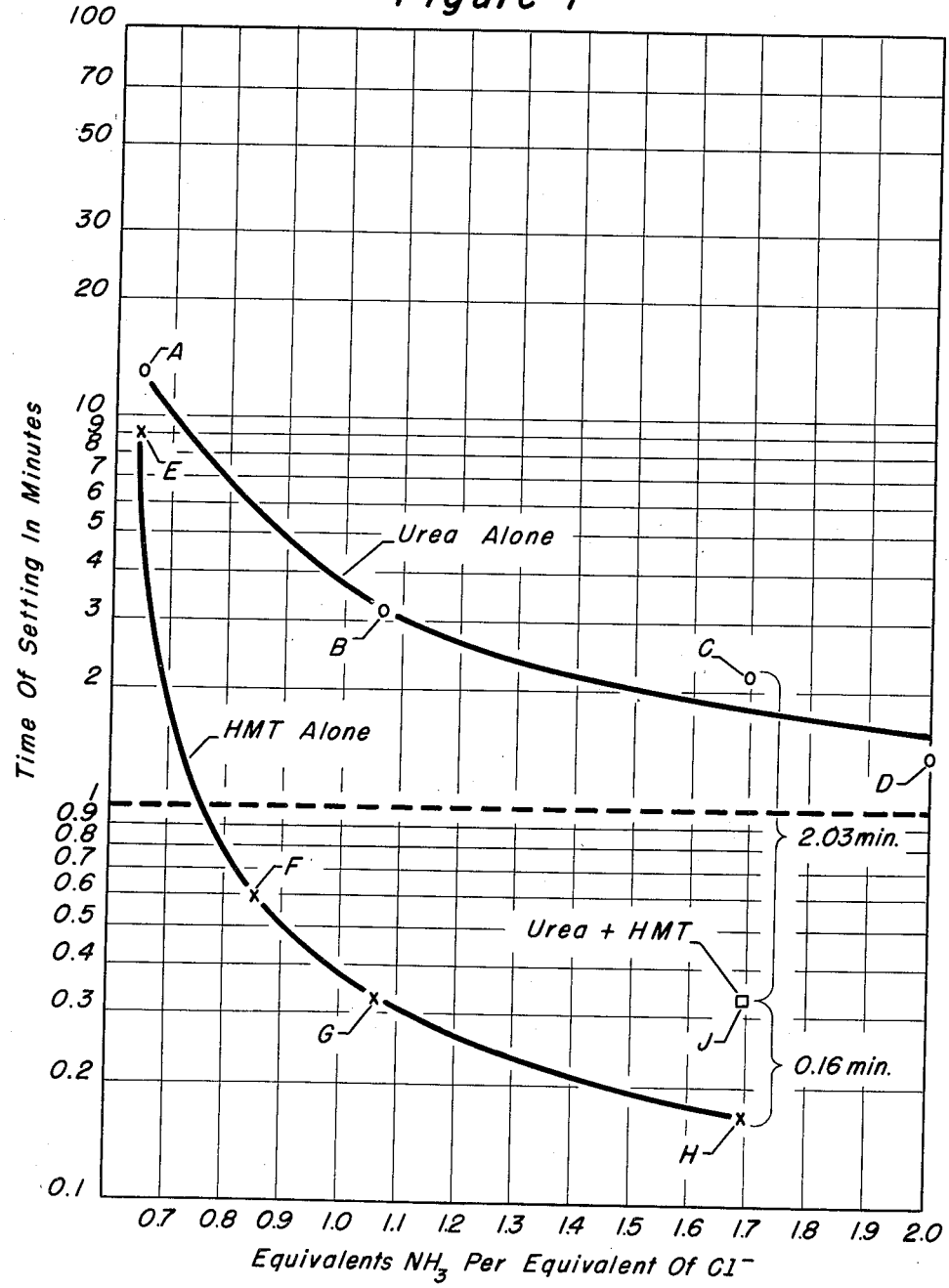

July 2, 1963  E. MICHALKO  3,096,295
MANUFACTURE OF SPHEROIDAL ALUMINA
Filed Nov. 24, 1959  2 Sheets-Sheet 2

INVENTOR:
Edward Michalko
BY:
Chester J. Giuliani
Philip T. Liggett
ATTORNEYS

United States Patent Office 3,096,295
Patented July 2, 1963

3,096,295
MANUFACTURE OF SPHEROIDAL ALUMINA
Edward Michalko, Chicago, Ill., assignor to Universal Oil Products Company, Des Plaines, Ill., a corporation of Delaware
Filed Nov. 24, 1959, Ser. No. 855,075
10 Claims. (Cl. 252—448)

The present application is a continuation-in-part of my co-pending application, Serial Number 606,954, filed August 30, 1956, now abandoned. This invention relates, in its broad aspect, to the manufacture of alumina, and, more specifically, is directed toward an improvement in the manufacture of spheroidal alumina particles.

The use of alumina particles in substantially spherical or spheroidal shape offers numerous advantages when the alumina is employed as an adsorbent, treating, refining, or purifying agent, or as a catalyst or component of a catalyst for the conversion of organic compounds and especially for the conversion of hydrocarbons. When employed as a fixed bed in a reaction or contacting zone, the spherically shaped particles permit a more uniform packing, thereby reducing variations in the pressure drop through said fixed bed, and in turn reducing channeling which inherently results in a portion of the bed being by-passed.

Another advantage to the utilization of spheroidal alumina particles is that they have no sharp edges to wear or break off during processing or handling and, therefore, the tendency to plug process equipment is reduced. These particular advantages are greatly magnified when the alumina particles are employed in a moving bed, that is, when the particles are transported from one section of a process to another by either the reactants, or by an extraneous carrying medium.

One of the first methods for manufacturing alumina particles of substantially spherical shape was by means of a pilling operation. Recently, spheroidal alumina particles of uniform size and shape, and uniformity of physical characteristics have been obtained by dispersing an alumina hydrosol in the form of droplets into a suitable gelling medium, and immediately thereafter subjecting the resulting alumina hydrogel spheroids to a particular series of aging treatments. The alumina hydrogel spheres are subjected to the aging treating in order to impart thereto certain desired physical characteristics. Generally, a complete aging treatment comprises aging in hot oil for a period of at least 10 hours, aging in a suitable liquid alkaline medium at least 10 hours, and finally, washing with water to reduce the concentration of alkaline medium, and to impart to the alumina spheres additional desired physical characteristics. This process, known as the "oil-drop" method, is described in greater detail in U.S.P. 2,620,314 issued to James Hoekstra. In such a process for forming and aging of alumina particles, it is essential that the hydrogel spheres are not contacted with water prior to being aged in the liquid alkaline medium. The spheres are water soluble at this stage of the process, and can thus be destroyed upon contact with water. The previously described aging treatment may be effected at a temperature of from about 120° F. to about 500° F., or more. Proper gellation and subsequent aging is not readily accomplished below 120° F., and above about 210° F., there exists the tendency for the rapid evolution of gases which causes the hydrogel spheres to rupture and otherwise become weak. By maintaining sufficient superatmospheric pressure during the forming and aging step, in order to maintain water in the liquid phase, higher temperatures may be employed for aging and/or forming frequently with improved results. Several advantages are afforded through the utilization of higher temperatures; one advantage being the elimination of the necessity for liquid alkaline aging. Thus, the spheres may be washed with water immediately following the oil aging. Another advantage results from the shorter period of time required for acceptable forming and adequate aging of the hydrogel spheres.

Extensive investigations have been conducted on the manufacture of spherical alumina particles by the oil-drop method. These investigations have shown that alumina particles are not as readily manufactured by this method as are some other inorganic oxide particles such as, for example, silica spheres. In order to obtain acceptable spherical particles of alumina, it is necessary to employ a sol which will not set to a gel until after some time interval has elapsed. For example, when adding a conventional precipitating reagent such as ammonium hydroxide to an aluminum salt, a gelatinous precipitate sets immediately, and therefore, cannot be formed into the desired spherical shape by this method of operation because of the time required for handling. It has been found, however, that said alumina particles may be manufactured by this method provided certain processing limitations are observed. Alumina particles may be manufactured by a method which comprises commingling, at below gellation temperature, an alumina hydrosol with hexamethylenetetramine, a weak base having a strong buffering action at a pH of from about 4 to about 10 and an increased rate of hydrolysis at an increased temperature, without the sudden evolution of gas. The resultant mixture is passed, in the form of droplets and while still below the temperature of gellation, into an oil bath maintained at elevated temperature and, as hereinbefore stated, sufficient pressure to maintain water at least partly in the liquid phase. The droplets are retained in said oil until they set into a firm hydrogel sphere.

As hereinbefore stated, hexamethylenetetramine has an increased rate of hydrolysis at an increased temperature without the rapid evolution of gas. This permits commingling the hexamethylenetetramine with the alumina sol at normal temperatures without immediately precipitating a gelatinous mass. Upon heating the mixture to an elevated temperature of from about 210° F. to about 500° F., at superatmospheric pressure, the hexamethylenetetramine decomposes to form ammonia which causes the hydrosol to set to a gel and permits forming alumina hydrogel spheres. The use of hexamethylenetetramine produces alumina hydrogel spheroids which are uniform in size and shape, and which possess uniformity of physical characteristics. Following the aging treatment, the spheroids are subjected to drying and calcining treatments and may be employed as the carrier material for various catalytically active components. The method of the present invention is applicable whatever the subsequent use of the spheroidal alumina particles produced by it.

An object of the present invention is to provide an improved method for manufacturing spherical alumina particles by providing a forming solution containing lesser quantities of the relatively expensive hexamethylenetetramine, alumina sol and urea.

I have discovered that the addition of an aqueous solution of urea to an alumina sol and the subsequent addition of hexamethylenetetramine reduces the amount of hexamethylenetetramine required for adequate setting of the hydrogel sphere, and affords, in situ, an economical source of ammonia which, under proper aging conditions, is utilized to neutralize the sol. On a weight basis, urea possesses 1.16 times as much ammonia as hexamethylenetetramine, and previous experiments have indicated that superior aging is obtained through the forming of ammonia in situ rather than through a subsequent alkaline aging step.

I have further found that urea and hexamethylenetetramine, when employed in admixture, will effect the gellation of a given quantity of an alumina hydrosol while employing lesser quantities of each than that quantity which, when employed in the absence of the other, would not result in gellation. That is, if X represents a quantity of urea which will not result in the gellation of a given quantity, H, of hydrosol, and Y is that quantity of hexamethylenetetramine which likewise does not result in gellation, a mixture of urea in an amount of $X-k_1$ (which is less than X) and hexamethylenetetramine in an amount of $Y-K_2$ (which is less than Y) will result in gellation, and significantly, but unexpectedly, this mixture is of a total quantity equal to or less than either X or Y. Expressed as mathematical equations:

$$H+X = \text{no gellation} \quad (1)$$
$$H+Y = \text{no gellation} \quad (2)$$
$$H+X+Y-(k_1+k_2) = \text{gellation} \quad (3)$$

and, $$X+Y-(k_1+k_2) \leq X \text{ or } Y \quad (4)$$

This rather unobvious phenomena is represented by the accompanying drawings, FIGURES 1 and 2, which are hereinafter described in detail with reference to the data illustrated therein.

In its broad aspect, the present invention provides a method for effecting the gellation of an alumina hydrosol which comprises separately preparing a mixture of urea and hexamethylenetetramine having an ammonia concentration within the range of about 0.75 to about 2.25 equivalents per equivalent of the anion which is combined with the aluminum in said hydrosol, and adding said mixture to said hydrosol thereby forming an alumina hydrogel.

It is well known that an alumina hydrosol may be prepared from suitable compounds of aluminum, such as aluminum chloride, aluminum bromide, aluminum sulfate, aluminum alcoholate, etc. Of these, aluminum chloride, as hereinafter set forth, is most generally employed as the source of aluminum. It is understood that, although the present invention affords advantages to processes which utilize at least one of the aforementioned compounds of aluminum, the results are not necessarily equivalent. The following description is directed to aluminum chloride hydrosols for the sake of simplicity and in view of the widespread use of such hydrosols.

In a broad embodiment, therefore, the present invention relates to a method of gelling an aluminum chloride hydrosol which comprises separately preparing a mixture of urea and hexamethylenetetramine having an ammonia concentration within the range of about 0.75 to about 2.25 equivalents per equivalent of chloride ion contained in said hydrosol and adding said mixture to the aluminum chloride hydrosol to form an aluminum hydrogel.

In another embodiment, the present invention relates to a method of manufacturing spheroidal alumina particles which comprises preparing an aluminum chloride hydrosol, separately preparing a mixture of urea and hexamethylenetetramine having an ammonia concentration within the range of about 0.75 to about 2.25 equivalents per equivalent of chloride ion contained in said hydrosol, commingling the urea-hexamethylenetetramine mixture with said hydrosol, passing the resultant mixture in the form of droplets into an oil bath maintained at gellation conditions, retaining the droplets in said oil bath until they set to hydrogel spheroids, and thereafter subjecting said spheroids to drying and calcination at an elevated temperature.

In a somewhat more limited embodiment, the method of the present invention affords advantages to the manufacture of spherical alumina particles, which method comprises forming an aluminum chloride hydrosol, commingling said sol with water to for a hydrosol containing from about 15% to about 35% by weight of alumina, separately preparing a mixture of urea and hexamethylenetetramine having an ammonia concentration within the range of about 1.0 to about 2.0 equivalents per equivalent of chloride ion contained in said hydrosol, commingling the urea-hexamethylenetetramine mixture with said hydrosol and passing the same in the form of droplets, and while below gellation temperature, into a hot oil bath maintained at a temperature of from about 120° F., to about 210° F., retaining the droplets in said hot oil until they set to hydrogel spheroids, thereafter subjecting said hydrogel spheroids to an aging treatment, and subjecting the resulting aged hydrogel spheroids to drying and calcination at an elevated temperature.

A specific embodiment of this invention is directed toward a method of manufacturing spheroidal alumina particles which comprises preparing an aluminum chloride hydrosol, commingling said hydrosol with water to form a solution containing from about 15% to about 35% by weight of alumina, separately commingling a solution of about 10% to about 30% by weight of urea with a solution containing from about 10% to about 30% by weight of hexamethylenetetramine, the resulting urea-hexamethylenetetramine mixture having an ammonia concentration within the range of from about 1.0 to about 2.0 equivalents per equivalent of chloride ion contained in said aluminum chloride hydrosol, commingling the aluminum chloride hydrosol, at below gellation temperature, with said urea-hexamethylenetetramine solution, passing the resultant mixture in the form of droplets and while still below gellation temperature into a hot oil bath maintained at a temperature of from about 120° F., to about 210° F., retaining the droplets in said hot oil until they set to hydrogel spheroids, aging said hydrogel spheroids in hot oil and a liquid alkaline medium, and thereafter subjecting the aged hydrogel spheroids to drying and calcination at an elevated temperature.

As hereinbefore mentioned, less forming and aging time is required at elevated temperatures: at these higher temperatures, from about 210° F., to about 500° F., it becomes necessary to effect the forming and aging at superatmospheric pressure. The pressure required is that which is sufficient to prevent the water, within the hydrogel spheres, from immediately vaporizing, thereby causing the spheres to rupture and otherwise be destroyed. In other words, the pressure at which forming and aging treatments are effected, at elevated temperatures, should be above the vapor pressure of water at the temperature employed.

In a preferred embodiment, an alumina sol is commingled with water to form a mixture containing from about 15% to about 35% by weight alumina. The alumina sol which is to be formed, and aged, in accordance with the present invention may be prepared in any suitable manner, a typical one being to digest a large excess of aluminum metal with an aqueous solution of 12% by weight hydrogen chloride to produce an aluminum chloride sol. In another method, a solution of aluminum chloride may be electrolyzed in an electrolytic cell having a porous partition between the anode and the cathode. In one of the more common methods of preparing alumina sol, aluminum metal is added to an aqueous solution of aluminum chloride and this mixture is subjected to heating and digesting at its boiling point. In general, the temperature will range from about 175° F., to about 220° F. The time of heating and digesting will depend upon the purity and particle size of the aluminum metal employed. It is understood that the method of the present invention is not particularly limited to the above described means of preparing alumina sol; however, the sol made by any method preferably has its concentration adjusted to yield a weight ratio of aluminum to chloride of about 1.2:1. The exact chemical composition of the alumina sol has not been definitely established but it may be represented by the following formula:

$$xAl(OH)_3 \cdot AlCl_3$$

wherein $x$ may be any number from about 4 to about 6.

The exact quantities of the urea and hexamethylenetetramine which are added to the alumina sol are dependent upon the concentration of the anion, combined with the aluminum, contained within the hydrosol. Thus, where the hydrosol is prepared from aluminum chloride, the quantity of the mixture of urea and hexamethylenetetramine is dependent upon the concentration of chloride ions within the sol which is to be converted into a hydrogel. As previously stated, the anion may be bromide, sulfate, etc. Suitable urea-hexamethylenetetramine mixtures are those having an ammonia concentration within the range of about 0.75 equivalent per equivalent of chloride ion, to about 2.25 equivalents. Effective gellation is achieved while employing a mixture having an intermediate ammonia concentration, that of about 1.0 equivalent to about 2.0 equivalents. It has been found that particularly good alumina spheres result through the use of a urea-hexamethylenetetramine mixture having a weight ratio of hexamethylenetetramine to urea of from about 0.3:1 to about 9:1. An intermediate weight ratio is preferred, and lies within the range of about 0.5:1 to about 1:1.

The following examples are introduced to illustrate further the novelty and utility of the present invention: it is understood that the present invention is not limited to the conditions and concentrations employed. The hydrosol employed in the examples illustrating the method of the present invention was an aluminum chloride sol prepared by digesting an excessive amount of aluminum metal in an aqueous solution of 12% by weight hydrogen chloride. The resulting alumina hydrosol had an aluminum to chloride weight ratio of 1.2:1, and was commingled with water to yield a final alumina hydrosol comprising 12% by weight aluminum.

EXAMPLE I 500 milliliters of the aluminum chloride hydrosol were commingled at about room temperature, with 500 milliliters of an aqueous solution of hexamethylenetetramine containing 296 grams of hexamethylenetetramine per liter of solution. The alumina sol and hexamethylenetetramine solutions were passed into a small mixer having a baffle rotated by a small motor. Droplets were emitted from the bottom of the mixer into the top of a forming tower 2 inches in diameter and 5 feet long. The forming tower was filled with a paraffinic hydrocarbon oil having a boiling point in excess of 400° F., and was maintained at a temperature of 203° F. by means of electrical heating elements. The resulting alumina hydrogel spheroids were then aged in the same oil at a temperature of 203° F., for a period of about 16 hours. The partially aged spheres were further aged in an aqueous solution of concentrated ammonium hydroxide for a period of about 24 hours at a temperature of 203° F. The aged spheres were then thoroughly washed with water, dried at a temperature of 248° F., and immediately calcined, in an atmosphere of air, at a temperature of 1200° F. The alumina spheres prepared in the above manner were rigid, of uniform size and shape, and were exposed to the atmosphere and washed with water without adverse effects. The apparent bulk density of these spheres was 0.54, and 99.5% were 10-mesh or larger, indicating about 0.5% or less breakage.

To another 500 milliliter portion of the alumina hydrosol was added 500 milliliters of an aqueous solution containing only 99 grams of hexamethylenetetramine and 49 grams of urea. The resultant mixture was formed into hydrogel spheroids, and said spheroids were subjected to the aging treatment hereinbefore described. The alumina spheres prepared utilizing the urea-hexamethylenetetramine solution had an apparent bulk density of 0.53, and mare than 99.5% were 10-mesh. The spheres were well formed, rigid, and not subject to breakage when exposed to the atmosphere and washed with water. Visual inspection of the spheres prepared with the urea-hexamethylenetetramine mixture indicated a more uniform, firm sphere less subject to attrition. The latter is attributed to a binding effect of the urea-hexametylenetetramine solution. The beneficial results of this effect are greatly magnified in a commercial size operation.

This example is given to illustrate the economic advantages of the method of the present invention by the substantial reduction of the amount of hexamethylenetetramine employed in the manufacture of spheroidal alumina particles.

EXAMPLE II

An aqueous solution of hexamethylenetetramine was prepared by adding sufficient water to 296 grams of hexamethylenetetramine to yield one liter of solution. A 5 milliliter portion of said hexamethylenetetramine solution was added to 10 milliliters of the alumina sol solution prepared in the manner previously described. The resulting mixture was placed in a stainless steel tube of ¼-inch diameter about 10 inches long. A pressure of 60 p.s.i.g. was then imposed upon said tube, and the tube immersed in a hot oil bath maintained at a temperature of 302° F., for a period of about 20 seconds. The tube was removed from the oil bath and the pressure was released. Inspection of the resulting hydrogel indicated a firm, rigid structure readily adaptable for aging and further processing.

Four milliliters of the previously described hexamethylenetetramine solution was commingled with 10 milliliters of the alumina sol solution, and the resulting mixture was subjected to the forming treatment described above. Inspection of the hydrogel thus formed indicated a weak, soft gel not easily adaptable to further processing and aging treatments.

Three milliliters of hexamethylenetetramine solution and 10 milliliters of the alumina sol solution were mixed and subjected to the forming treatment previously described. Not even a partial setting of the alumina sol to a hydrogel was evident after a period of 60 seconds immersion in the hot oil bath.

An aqueous solution of urea was prepared by adding sufficient water to 254 grams of urea to form one liter of solution. Five milliliters of said urea solution were added to a 10 milliliter portion of the alumina sol prepared in the manner previously described. To the urea-alumina sol mixture was added 3 milliliters of the previously described hexamethylenetetramine solution. The hexamethylenetetramine-urea-alumina sol mixture was then placed in the stainless steel tube hereinbefore described. A pressure of 60 p.s.i.g. was imposed on said tube, and the tube immersed in a hot oil bath maintained at a temperature of 302° F., for a period of 20 seconds. The tube was then removed, and the pressure released; the contents of the tube were inspected, and there was found a hard alumina hydrogel.

EXAMPLE III

This experiment was conducted in the absence of hexamethylenetetramine for the purpose of illustrating the inadequacy of utilizing only urea as the source of the gelling agent. The quantities of alumina hydrosol and urea employed, were in a direct proportion to the hydrosol and hexamethylenetetramine employed in Example I while forming the alumina spheres by the oil-drop method.

An aqueous solution of 25.4 grams of urea per 100 milliliters of solution—an ammonia content equal to that of 29.6 grams of hexamethylenetetramine per 100 milliliters of solution—was prepared, and commingled with an equal volume of an alumina hydrosol having an aluminum to chloride weight ratio of 1.12:1.

The resulting mixture was placed in a stainless steel tube of ¼-inch diameter, about 10 inches in length. A pressure of 60 pounds per square inch was then imposed thereon, and the tube, and contents, immersed in a hot-oil bath maintained at a temperature of 302° F. The tube was removed from the oil bath after 60 seconds, and the pressure was released. The mixture was found to have remained fluid even after this extended period of immersion at the high temperature.

This example clearly indicates the difference between the functions served by the hexamethylenetetramine and the urea, and the effects resulting through the use thereof. The hexamethylenetetramine serves as a source of ammonia during the initial stages of the sphere formation, and the urea serves to combine with the formaldehyde resulting from the decomposition of the hexamethylenetetramine. The effective elimination of formaldehyde permits the decomposition of hexamethylenetetramine to proceed more rapidly, and to a greater extent, in order to supply the necessary ammonia. Urea alone cannot serve the function of hexamethylenetetramine in the process of the present invention, even though the urea can serve as the source of the ammonia necessary to effect gellation of the hydrosol: the utilization of urea alone does not lead to the formation of firm hydrogel spheroids.

EXAMPLE IV

The data obtained in the following series of experiments is illustrated in the accompanying drawing, that of FIGURE 1. The aluminum chloride hydrosol, employed in the several experiments, was prepared by digesting an excessive quantity of aluminum metal in an aqueous solution of 12% by weight hydrogen chloride. The resulting aluminum chloride hydrosol was commingled with a sufficient quantity of water to yield a final hydrosol consisting of 12% by weight of aluminum, and having an aluminum to chloride weight ratio of 1.2:1. In all the experiments, there was utilized 10 milliliters of the aluminum chloride hydrosol, which 10 milliliters contained 40 milli-equivalents of chloride. To illustrate the unexpected results obtained through the use of the mixture, a one minute time period was arbitrarily chosen as the basis for the setting of the hydrogel.

The solution of hexamethyleneteramine was prepared by dissolving 29.6 grams of hexamethylenetetramine in 100 milliliters of water to form a solution comprising 28% by weight of hexamethylenetetramine. As further identification, 10 milliliters of the hexamethylenetetramine solution contained 84.6 milli-equivalents of ammonia. The solution of urea was prepared by dissolving 25.4 grams of urea in 100 milliliters of water, and further diluting to yield a solution containing the same number of milli-equivalents of ammonia per milliliter as the hexamethylenetetramine solution.

*Experiment IV–A.*—Three milliliters of the urea solution, prepared as hereinabove described, were commingled with 10 milliliters of the aluminum chloride hydrosol. The resulting mixture contained 0.64 milli-equivalent of ammonia per milli-equivalent of chloride. The mixture was immersed in an oil bath maintained at a temperature of 302° F. The aluminum chloride hydrosol was found to have set into a hydrogel after a period of 13 minutes. The datum point representing this result is designated as point A in FIGURE 1.

*Experiment IV–B.*—Five milliliters of the urea solution were commingled with 10 milliliters of the aluminum chloride hydrosol to yield a mixture containing 1.06 milli-equivalents of ammonia per milli-equivalent of chloride. The mixture was immersed in the oil bath, maintained at a temperature of 302° F., and the hydrosol was set to a hydrogel in 3.2 minutes. This result appears in FIGURE 1 as point B.

*Experiment IV–C.*—Eight milliliters of urea, commingled with 10 milliliters of the aluminum chloride hydrosol, yielding thereby a mixture having 1.69 milli-equivalents of ammonia per milli-equivalent of chloride, set to a hydrogel in 2.2 minutes when immersed in the 302° F. oil bath. The datum point is designated C in FIGURE 1.

*Experiment IV–D.*—Ten milliliters of urea, commingled with 10 milliliters of the aluminum chloride hydrosol, yielding thereby a mixture having 2.12 milli-equivalents of ammonia per milli-equivalent of chloride, set into a hydrogel in 1.5 minutes.

That this first series of experiments indicate the non-applicability of urea to set a given quantity of an aluminum chloride hydrosol with an arbitrarily chosen period of time, is clearly indicated by the curve ABCD, in FIGURE 1. A second series of experiments utilized the hexamethylenetetramine solution in a manner identical to that employed with the urea, but in the complete absence of the latter.

*Experiment IV–E.*—Three milliliters of hexamethylenetetramine were commingled with 10 milliliters of the aluminum chloride hydrosol to yield a mixture containing 0.64 milli-equivalent of ammonia per milli-equivalent of chloride. This mixture set into a hydrogel in 9 minutes when immersed in the hot oil bath. (Point E in FIGURE 1.)

*Experiment IV–F.*—Four milliliters of the hexamethylenetetramine solution, commingled with 10 milliliters of the aluminum chloride hydrosol, yielding thereby a mixture having 0.85 milli-equivalent of ammonia per milli-equivalent of chloride, set to a hydrogel in 0.6 minute. (Point F.)

*Experiment IV–G.*—Five milliliters of hexamethylenetetramine and 10 milliliters of the aluminum chloride hydrosol, which mixture contained 1.06 milli-equivalents of ammonia per milli-equivalent of chloride, set to a firm hydrogel in 0.33 minute. (Point G.)

*Experiment IV–H.*—Eight milliliters of hexamethylenetetramine were commingled with 10 milliliters of the aluminum chloride hydrosol, yielding 1.69 milli-equivalents of ammonia per milli-equivalent of chloride, was found to set to a hydrogel in 0.17 minute. (Point H.)

*Experiment IV–J.*—Five milliliters of urea and 3 milliliters of hexamethylenetetramine were commingled with 10 milliliters of the aluminum chloride hydrosol. The resulting mixture contained 1.69 milli-equivalents of ammonia per milli-equivalent of chloride, and was found to have set into a hydrogel in 0.33 minute. (Point J in FIGURE 1.)

The data obtained from the various experiments are graphically illustrated in the accompanying FIGURE 1. It is readily ascertained, in view of the illustrated data, that urea cannot be considered as equivalent to hexamethylenetetramine, for adaptation in the present method of manufacturing firm alumina hydrogel spheroids. Further, FIGURE 1 clearly indicates the unexpectedness of the result obtained through the use of the mixture of urea and hexamethylenetetramine. It should be noted that FIGURE 1 is illustrated on a semi-logarithmic graph; this particular form of illustrating the above data was chosen in order to separate points H and J. Had the data been plotted on an arithmetic graph it is evident that these points would be virtually superimposed, thus destroying the intended illustration. The data points presently under consideration are those three representing 1.7 equivalents of ammonia per equivalent of chloride ion contained within the alumina hydrosol, points C, J and H. Referring to FIGURE 1, illustrated on the semi-logarithmic graph, the lowest datum point on the curve representing the use of hexamethylenetertamine alone, point H, curve EFGH, denotes a setting time of 0.17 minute, while employing 8 milliliters of hexamethylenetetramine. When 8 milliliters of the urea solution were utilized, in the absence of any hexamethylenetetramine, point C, which amount of urea yields 1.7 equivalents of ammonia per equivalent of chloride ion, the required gellation period was 2.2 minutes. When utilizing a mixture consisting of 3 milliliters of hexamethylenetetramine and 5 milliliters of urea, point J, the gellation period was shown to be 0.33 minute. It is further indicated that 3 milliliters of hexamethylenetetramine, in the absence of urea, point E required a gellation period of 9 minutes, that 5 milliliters of urea, in the absence of hexamethylenetetramine, point B, required a gellation period of 3.2 minutes. In view of the foregoing, a combination of 3 milliliters of hexamethylenetetramine and 5 milliliters of urea might be expected to require a gellation period of about 1.3 minutes, which period is in excess of that which has been arbitrarily chosen. However, to the contrary, the combination of urea and hexamethylenetetramine effected a gellation of the alumina hydrosol within a period of 0.33 minute, or only 0.16 minute longer than when utilizing 8 milliliters of hexamethylenetetramine. Had it been decided to illustrate this data through the use of an arithmetic graph, it is clear that the datum points representing the use of hexamethylenetetramine alone, and the mixture of urea and hexamethylenetetramine, would appear to be virtually superimposed one upon the other.

EXAMPLE V

Figure 2:
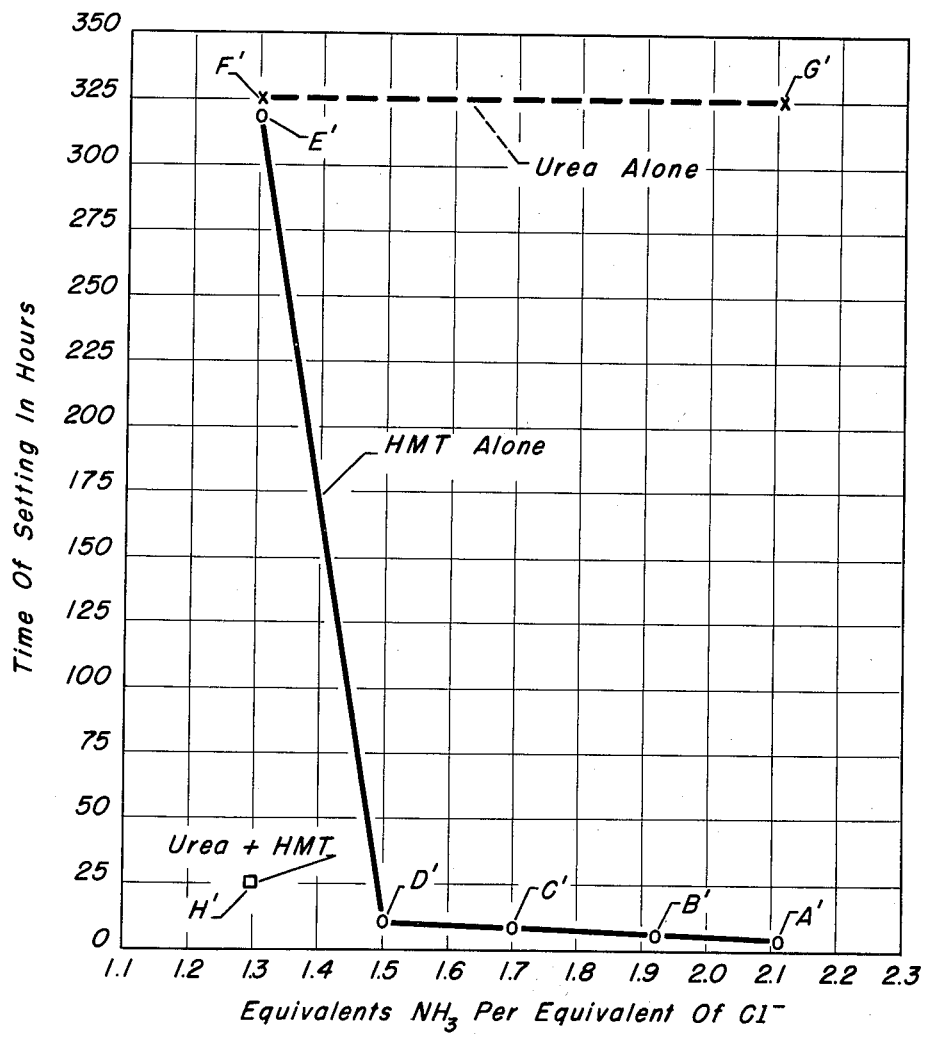

For the purpose of further, and more clearly, illustrating the unexpectedness of the result obtained through the use of the mixture of urea and hexamethylenetetramine, reference is now directed to accompanying FIGURE 2. Illustrated in the figure are line F'G', representing the use of urea in the absence of hexamethylenetetramine; line A'B'C'D'E', representing the use of hexamethylenetetramine in the absence of urea; and datum point H', representing the use of a mixture of urea and hexamethylenetetramine.

These data were obtained at room temperature, approximately 80° F., utilizing an aluminum chloride hydrosol prepared by digesting metallic aluminum in concentrated hydrochloric acid. The physical characteristics of the hydrosol were, a specific gravity of 1.4090, an aluminum to chloride weight ratio of 1.25:1, and an aluminum content of 13.8% by weight. The various mixtures of the hydrosol, urea and/or hexamethylenetetramine and water were placed in 20-ml. Pyrex glass test tubes were allowed to stand at room temperature until gellation had been effected, or until it became certain that gellation was not possible. Room temperature was chosen as the standard gellation temperature in order to obtain a more graphical and effective illustration. In addition, since the decomposition of urea and hexamethylenetetramine is catalyzed to a great extent by elevated temperatures, the use of room temperature permits a more clear presentation of the data by affording a greater range of setting times.

The first series was designed to determine that quantity of hexamethylenetetramine which would not cause the hydrosol to set to a hydrogel. These data are given in Table I, and were employed in scribing line A'B'C'D'E' in FIGURE 2.

Table I

| Mixture Designation | A' | B' | C' | D' | E' |
|---|---|---|---|---|---|
| Mixture Composition, ml.: | | | | | |
| Hydrosol | 10 | 10 | 10 | 10 | 10 |
| Water | | 1 | 2 | 3 | 4 |
| HMT | 10 | 9 | 8 | 7 | 6 |
| Urea | | | | | |
| Equivalents NH$_3$/Cl- | 2.12 | 1.92 | 1.70 | 1.49 | 1.28 |
| Gellation Period, hours | 2.0 | 4.0 | 8.75 | 11.0 | [1] 300 |

[1] Mixture E' was still completely fluid after more than 310 hours. The number 300 was chosen in order to simplify the illustration of the data in Figure 2.

As indicated in Table I, the use of six milliliters of hexamethylenetetramine did not effect the gellation of the hydrosol. Quantities in excess of this amount did result, eventually, in gellation.

In a second series, represented by points F' and G', urea, in and of itself, was employed in amounts to define the range of ammonia equivalents resulting when hexamethylenetetramine was employed alone. The data are given in following Table II:

Table II

| Mixture Designation | F' | G' |
|---|---|---|
| Mixture Composition: | | |
| Hydrosol | 10 | 10 |
| Water | 4 | |
| HMT | | |
| Urea | 6 | 10 |
| Equivalents NH$_3$Cl- | 1.28 | 2.12 |
| Gellation Period, hours | [1] 300 | [1] 300 |

[1] Both of these mixtures were fluid after a period of more than 575 hours. Again, the number 300 was chosen to facilitate the illustration of the data in Figure 2.

From the foregoing, it has been established that, although ten milliliters of HMT will effect gellation, a like quantity of urea will not; and, neither six milliliters of hexamethylenetetramine, nor six of urea, when employed in the absence of the other, will cause the hydrosol to set into a hydrogel.

An additional three mixtures were prepared, maintaining the ammonia concentration constant and at that level represented by either six milliliters of urea, or six of hexamethylenetetramine, neither of which, alone, effected gellation. The data are represented in FIGURE 2 by a single point H'; the gellation times were so nearly identical as to justify the use of this single point. The gellation data, H', J' and K', are given in Table III and that resulting through the use of six milliliters of urea alone, and HMT alone, is repeated for convenience.

Table III

| Mixture Designation | E' | H' | J' | K' | F' |
|---|---|---|---|---|---|
| Mixture Composition, ml.: | | | | | |
| Hydrosol | 10 | 10 | 10 | 10 | 10 |
| Water | 4 | 4 | 4 | 4 | 4 |
| HMT | 6 | 3 | 4 | 5 | |
| Urea | | 3 | 2 | 1 | 6 |
| Equivalents NH$_3$/Cl- | 1.28 | 1.28 | 1.28 | 1.28 | 1.28 |
| Gellation Period, hours | 300 | 28.0 | 24.0 | 28.5 | 300 |

It is readily ascertained that an unobvious benefit is achieved through the utilization of a mixture of urea and hexamethylenetetramine, each of which is employed in a quantity less than that employed when each is used in the absence of the other. As hereinbefore stated, a mixture of two substances is shown to effect gellation, although gellation is not effected when using a greater amount of either in the absence of the other.

The foregoing examples are given for the purpose of illustrating the present invention, and to indicate the benefits afforded through the utilization thereof. It is not intended, however, to limit the invention beyond the scope and spirit of the appended claims.

I claim as my invention:

1. A method of gelling an alumina hydrosol which comprises preparing a mixture of urea and hexamethylenetetramine having a weight ratio of hexamethylenetetramine to urea of from about 0.3:1 to about 9:1 and an ammonia concentration within the range of about 0.75 to about 2.25 equivalents per equivalent of the anion which is combined with the aluminum in said hydrosol and adding said mixture to the alumina hydrosol thereby forming an alumina hydrogel.

2. A method of manufacturing alumina which comprises separately preparing an aluminum chloride hydrosol and a mixture of urea and hexamethylenetetramine, the latter having a weight ratio of hexamethylenetetramine to urea of from about 0.3:1 to about 9:1 and an ammonia concentration within the range of about 0.75 to about 2.25 equivalents per equivalent of chloride ion contained in said hydrosol, adding said mixture to the aluminum chloride hydrosol and thereafter drying the resulting alumina hydrogel and calcining the same at an elevated temperature sufficient to convert said hydrogel to alumina.

3. A method of manufacturing spheroidal alumina particles which comprises preparing an aluminum chloride hydrosol, separately preparing a mixture of urea and hexamethylenetetramine having a weight ratio of hexamethylenetetramine to urea of from about 0.3:1 to about 9:1 and an ammonia concentration within the range of about 0.75 to about 2.25 equivalents per equivalent of chloride ion contained in said hydrosol, commingling said mixture with said hydrosol, passing the resultant mixture in the form of droplets into an oil bath maintained at gelation conditions, retaining the droplets in said oil bath until they set to hydrogel spheroids, and thereafter subjecting said spheroids to drying and calcination at an elevated temperature sufficient to convert said hydrogel to alumina.

4. The method of claim 3 further characterized in that the ammonia concentration of said urea-hexamethylenetetramine mixture is within the range of about 1.0 to about 2.0 equivalents per equivalent of chloride ion contained in said aluminum chloride hydrosol.

5. A method of manufacturing spheroidal alumina particles which comprises forming an aluminum chloride hydrosol, commingling said sol with water to form a hydrosol containing from about 15% to about 35% by weight of alumina, separately preparing a mixture of urea and hexamethylenetetramine having a weight ratio of hexamethylenetetramine to urea of from about 0.3:1 to about 9:1 and an ammonia concentration within the range of about 1.0 to about 2.0 equivalents per equivalent of chloride ion contained in said hydrosol, commingling said mixture with said hydrosol and passing the same in the form of droplets, and while below gelation temperature, into a hot oil bath maintained at a temperature of from about 120° F. to about 210° F., retaining the droplets in said hot oil until they set to hydrogel spheroids, thereafter subjecting said hydrogel spheroids to an aging treatment, and subjecting the resulting aged hydrogel spheroids to drying and calcination at an elevated temperature.

6. The method of claim 5 further characterized in that said mixture of urea, and hexamethylenetetramine is prepared by commingling aqueous solutions containing from about 10% to about 30% by weight each of said urea and hexamethylenetetramine.

7. A method of manufacturing spheroidal alumina particles which comprises preparing an aluminum chloride hydrosol, commingling said hydrosol with water to form a solution containing from about 15% to about 35% by weight of alumina, separately commingling a solution of about 10% to about 30% by weight of urea with a solution containing from about 10% to about 30% by weight of hexamethylenetetramine, the resulting urea-hexamethylenetetramine solution having a weight ratio of hexamethylenetetramine to urea of from about 0.3:1 to about 9:1 and an ammonia concentration within the range of from about 1.0 to about 2.0 equivalents per equivalent of chloride ion contained in said aluminum chloride hydrosol, commingling, at below gelation temperature, said aluminum chloride hydrosol with said urea-hexamethylenetetramine solution, passing the resultant mixture in the form of droplets and while still below gelation temperature into a hot oil bath maintained at a temperature of from about 120 F. to about 210° F., retaining the droplets in said hot oil until they set to hydrogel spheroids, aging said hydrogel spheroids in hot oil and a liquid alkaline medium, and thereafter subjecting the aged hydrogen spheroids to drying and calcination at an elevated temperature.

8. The method of claim 7 further characterized in that said hot oil bath is maintained at superatmospheric pressure and a temperature of from about 210° F. to about 500° F.

9. The method of claim 7 further characterized in that said hexamethylenetetramine and urea are commingled in amounts to yield a mixture having a weight ratio of hexamethylenetetramine to urea of from about 0.5:1 to about 1:1.

10. The method of claim 1 further characterized in that the weight ratio of hexamethylenetetramine to urea in said mixture is from about 0.5:1 to about 1:1.

References Cited in the file of this patent

UNITED STATES PATENTS

| | | |
|---|---|---|
| 2,492,167 | Marisic et al. | Dec. 27, 1949 |
| 2,620,314 | Hoekstra | Dec. 2, 1952 |
| 2,672,453 | Wankat | Mar. 16, 1954 |
| 2,703,315 | Murray et al. | Mar. 1, 1955 |
| 2,798,050 | Gladrow et al. | July 2, 1957 |